United States Patent [19]

Kudsia et al.

[11] 4,109,202
[45] Aug. 22, 1978

[54] TRAFFIC SWITCHING IN COMMUNICATIONS SATELLITES

[75] Inventors: Chandra Mohan Kudsia, Dollard-des-Ormeaux; Harry John Moody, Pierrefonds; Lorne Allan Keyes, Montreal, all of Canada

[73] Assignee: RCA Corporation, New York, N.Y.

[21] Appl. No.: 783,656

[22] Filed: Apr. 1, 1977

[30] Foreign Application Priority Data

Aug. 24, 1976 [GB] United Kingdom ............... 35194/76

[51] Int. Cl.² .......................... H04B 7/20; H03H 7/46
[52] U.S. Cl. .......................................... 325/3; 325/4; 333/1.1;6;7 R
[58] Field of Search .................... 333/1.1, 6; 325/1–3, 325/4, 9, 11; 179/15 FE

[56] References Cited

U.S. PATENT DOCUMENTS

| 3,768,043 | 10/1973 | Foldes | 333/6 |
| 3,865,990 | 2/1975 | Kuenemund | 333/6 X |
| 4,002,980 | 1/1977 | Herz | 325/3 |
| 4,041,389 | 8/1977 | Oades | 325/3 |

Primary Examiner—Paul L. Gensler
Attorney, Agent, or Firm—H. Christoffersen; Samuel Cohen; Carl V. Olson

[57] ABSTRACT

A channel switching system useful in a satellite for amplifying some or all of three different RF frequency-band channel signals in two traveling wave tube amplifiers and transmitting the signals via two spot antennas to two regions on earth. Two signals are normally amplified in the two amplifiers and directed to the two regions on earth. A third frequency channel signal can be simultaneously applied through one or the other of the two paths. If an amplifier fails, the third frequency channel can be directed through the remaining operative amplifier to either one of the two regions on earth.

8 Claims, 1 Drawing Figure

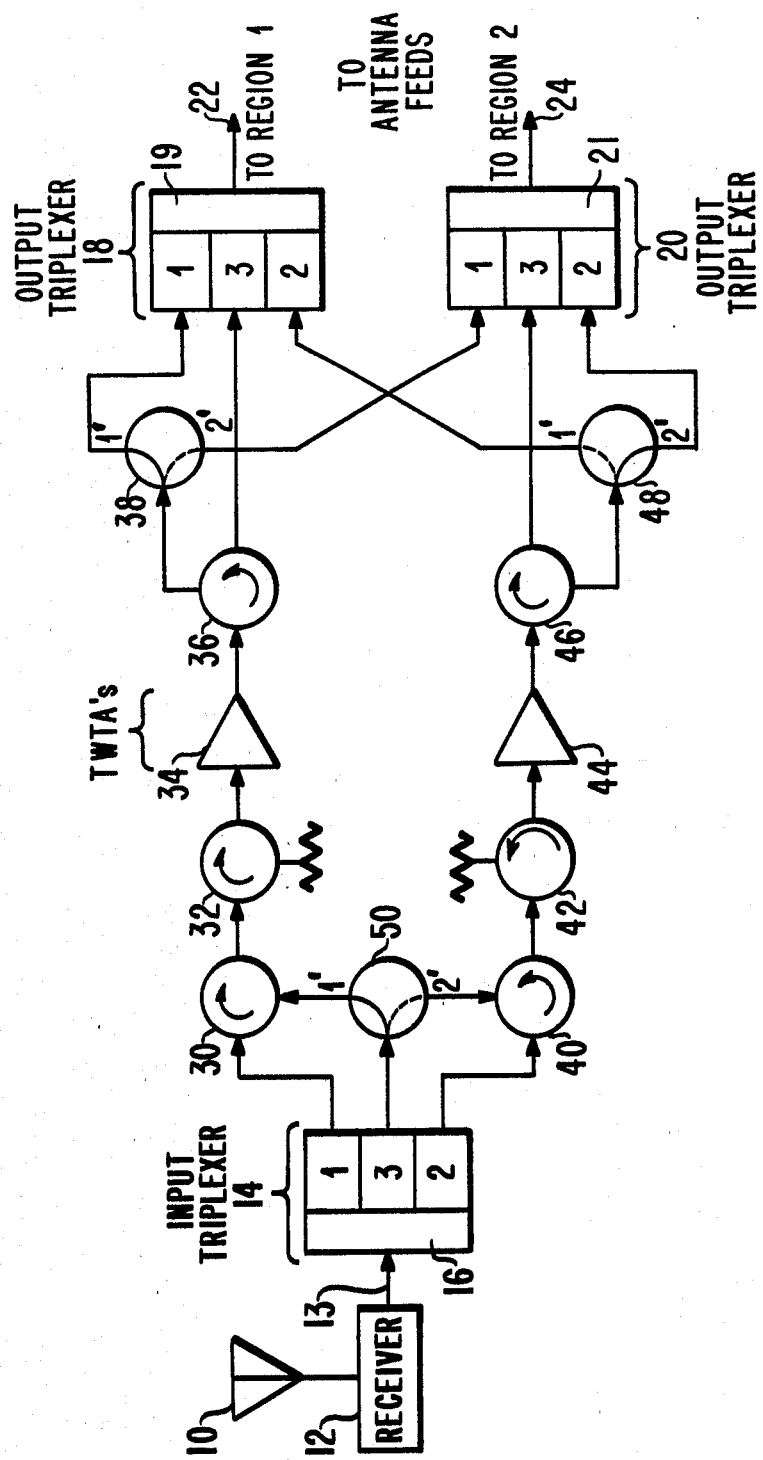

TRAFFIC SWITCHING IN COMMUNICATIONS SATELLITES

Communications satellites include transponders which receive signals from earth in one frequency range, translate the signals to another frequency range, amplify the signals in amplifiers such as traveling wave tube amplifiers, and transmit the signals back to earth. Means may be included in the satellite to substitute a redundant amplifier for one that has failed. However, redundant amplifiers and their switches add undesirably to the weight of the satellite which must be launched into orbit. The problem of maintaining service when an amplifier fails is more complicated in satellites which direct certain signals through respective spot antennas to distinct regions on earth.

In the system described herein, service is maintained in a communications satellite to two receiving regions on earth despite failure of an amplifier, without including a redundant amplifier in the satellite, by means of a frequency channel switching system which diverts channels from a disabled amplifier to a remaining operative amplifier, and thence to an antenna directed to an intended region on earth.

The sole FIGURE of the drawing is a schematic diagram of a satellite transponder arranged in accordance with the teachings of the invention.

An antenna 10 on a satellite conveys a received signal at frequencies which may be in the 14 GHz range to a receiver 12 in which the signals are amplified and translated to different frequencies which may be in the 12 GHz range. The signal from receiver 12 may consist of signals in many channel frequency bands each having a width of about 80 MHz. An output 13 from the receiver couples the signals, in three different channel frequency bands, to an input triplexer 14. Other outputs (not shown) from receiver 12 may be connected to other triplexers or the like (not shown).

The input triplexer 14 may be of conventional construction including a manifold 16 coupled to three 8-section, channel-separating Chebyshev band-pass filters in standard waveguide structures, the three filters being designated 1, 2 and 3 to represent three different channel frequency bands, each 80 MHz wide in the 12 GHz range.

The system also includes two output triplexers 18 and 20, each including band-pass filters designated 1, 2 and 3 to represent the same channel frequency bands accommodated by the input triplexer 14, and manifolds 19 and 21, respectively, coupled over r-f paths 22 and 24 to antenna feeds for two spot antennas (not shown) pointed to two separate regions on earth. The band-pass filters in the output triplexers 18 and 20 may be constructed using cylindrical cavities, instead of the conventional rectangular cavities, to provide higher Q and lower loss.

Information about multiplexers (including triplexers) is contained in a section entitled, "Theory and Design of Diplexers and Multiplexers", by G. L. Matthaei and E. G. Cristal at page 237 et seq. of *Advances in Microwaves Series*, Leo Young, Editor, Vol. 2, published in 1967 by Academic Press. Additional information is contained in the book, *Microwave Filters for Communications Systems* by Kudsia and O'Donovan, published in 1974 by Artech House.

A path is provided from band-pass filter 1 in input triplexer 14 through a first circulator 30, an isolator 32, a traveling wave tube amplifier 34, a second circulator 36 and a switch 38 to the band-pass filter 1 of output triplexer 18. A second similar path is provided from band-pass filter 2 in input triplexer 14 through a first circulator 40, an isolator 42, a traveling wave tube amplifier 44, a second circulator 46 and a switch 48 to the band-pass filter 2 of output triplexer 20. These two paths are normally used to amplify the signals in frequency channels 1 and 2, and to transmit them to antennas from which the signals are radiated to two different separated regions on earth.

Information about circulators and isolators is contained in a section entitled, "Junction Circulators", by H. Bosma at page 125 et seq. of *Advances in Microwaves Series*, Leo Young, Editor, Vol. 6, published in 1971 by Academic Press.

Channel 1 signals in the first path may be switched by switch 38 to band-pass filter 1 in the second output triplexer 20. Similarly, channel 2 signals in the second path may be switched by switch 48 to band-pass filter 2 in the first output triplexer 18. The switches 38 and 48 therefore permit channel 1 signals and channel 2 signals to be directed to either one or the other of the two regions on earth served by the antennas coupled to lines 22 and 24.

Provision is also made for amplifying signals of a third frequency channel 3 in one or the other of the two described signal paths. This is accomplished by a third switch 50 which couples signals from band-pass filter 3 in input triplexer 14 to the circulator 30 in the first path, or the circulator 40 in the second path. A channel 3 signal in the first path is coupled from circulator 36 to the band-pass filter 3 in output triplexer 18, and thence to the antenna served by line 22. Similarly, a channel 3 signal in the second path is coupled from circulator 46 to the band-pass filter 3 in output triplexer 20, and thence to the antenna served by line 24.

The manner in which the band-pass filters and the circulator cooperate to determine the signal routing will now be described. A channel 1 signal passed by amplifier 34 in the first path to circulator 36 passes around the circulator and out to band-pass filter 3 in output triplexer 18, from which the signal is reflected back to the circulator 36. The channel 1 signal continues around the circulator and out to the switch 38 which may be set to route the signal to either of the two output triplexers 18 and 20. In either case, the signal encounters a channel 1 band-pass filter which passes the channel 1 signal out to the antenna fed from the particular triplexer.

A channel 2 signal passed by amplifier 44 in the second path behaves in the same manner as has been described for a channel 1 signal.

A channel 3 signal from band-pass filter 3 in the input triplexer 14 may be directed by switch 50 to the circulator 30 in the first path. The channel 3 signal passes around circulator 30, is coupled to band-pass filter 1 in input triplexer 14, from which the channel 3 signal is reflected back to the circulator, and then on through the isolator 32 and the traveling wave tube amplifier to the second circulator 36. The channel 3 signal is then coupled to and through the band-pass filter 3 in the output triplexer 18 and to the antenna served thereby. The channel 3 signal from band-pass filter 3 in input triplexer 14, alternatively, may be directed by switch 50 to the second path leading to the antenna fed from the second output triplexer 20.

If one of the traveling wave tube amplifiers fails, say amplifier 34, then the information previously transmitted from ground station on the channel 1 frequency is transmitted instead on the channel 3 frequency band. The switch 50 in the satellite is then set in response to a command signal transmitted from the ground to direct the received channel 3 signal through the second path including the remaining operative traveling wave tube amplifier 44. The channel 3 signal at the output of amplifier 44 is applied via one output port of circulator 46 to the input to the third channel band-pass filter 3 in the output triplexer 20. On the other hand, when channel 2 signal is present at the output of amplifier 44, it may be directed by switch 48 to either one of the output triplexers and corresponding antennas. In this way, the power of the good amplifier 44 can be shared by two channel signals directed to two output triplexers 18 and 20 and corresponding antennas.

When both traveling wave tube amplifiers 34 and 44 are operative, some of the power from one can be utilized to provide additional service to one or the other of two regions on earth illuminated by the two antennas.

The following table shows the routings for all possible settings of the three switches 38, 48 and 50, as well as indicating whether the first path No. 1 including amplifier 34, or the second path No. 2 including amplifier 44, carries the signal:

| Downlink to Channel No | Region 1 | | | Region 2 | | |
|---|---|---|---|---|---|---|
|  | 1 | 3 | 2 | 1 | 3 | 2 |
| Switch States | | | | | | |
| 38 50 48 | | | | | | |
| 1' 1' 2' | Path 1 | Path 1 | Path 2 | | | |
| 1' 1' 1' | Path 1 | Path 1 | | | | Path 2 |
| 1' 2' 2' | Path 1 | | Path 2 | | Path 2 | |
| 1' 2' 1' | Path 1 | | | | Path 2 | Path 2 |
| 2' 1' 2' | | Path 1 | Path 2 | Path 1 | | |
| 2' 1' 1' | | Path 1 | | Path 1 | | Path 2 |
| 2' 2' 2' | | | Path 2 | Path 1 | Path 2 | |
| 2' 2' 1' | | | | Path 1 | Path 2 | Path 2 |

If amplifier 34 fails, switch 38 has no effect and the number of possible states is cut in half. Similarly, if amplifier 44 fails, switch 48 has no effect.

There has been described a channel switching system useful in a satellite for amplifying some or all of three different r-f frequency-band channel signals in two traveling wave tube amplifiers and transmitting the signals via two spot antennas to two regions on earth. Two signals are normally amplified in the two amplifiers and directed to the two regions on earth. A third frequency channel signal can be simultaneously applied through one or the other of the two paths. If an amplifier fails, the third frequency channel can be directed through the remaining operative amplifier to either one of the two regions on earth.

What is claimed is:

1. In a transponder useful in a satellite for transmitting signals in three different r-f frequency band channels via two antennas to two regions on earth, the combination of
   an input triplexer having outputs for three different band channels,
   two output triplexers each having three inputs for said three different frequency band channels, and each having one output for coupling to a respective antenna feed,
   two signal paths from two outputs of said input triplexer to corresponding inputs of respective ones of said two output triplexers, each of said paths including, in the order named, a first circulator, an amplifier, a second circulator, and a single-pole, double-throw switch,
   a third switch for connecting a third output of the input triplexer to the first circulator in a selected one of said two signal paths, whereby to couple therein signals of a third frequency band channel, and
   means coupling second outputs of the second circulators in said two signal paths to third inputs of respective output triplexers.

2. The combination of claim 1 wherein said amplifiers are traveling wave tube amplifiers.

3. The combination defined in claim 2 wherein the switch in each of said two signal paths permits reconnecting each of said signal paths from an input of a respective output triplexer to the corresponding input of the other output triplexer.

4. The combination of
   a first triplexer having outputs for three different r-f frequency channels,
   second and third triplexers each having inputs for said three different frequency channels,
   first and second signal paths from two outputs of the first triplexer to corresponding inputs, respectively, of said second and third triplexers, each of said paths including a first circulator having three ports, an amplifier and first and second ports of a second circulator having three ports,
   a switch coupling a third output of said first triplexer to a port of the first circulator in a selected one of said signal paths, whereby to couple therein signals of a third frequency channel,
   means coupling a third port of the second circulator in the first signal path to the third input of the second triplexer, and
   means coupling a third port of the second circulator in the second signal path to the third input of the third triplexer.

5. The combination defined in claim 4, and in addition, switch means to reconnect the second port of the second circulator of each of said signal paths from an input to one of said second and third triplexers to a corresponding input of the other one of said second and third triplexers.

6. In combination,
   a first signal path including a first input band-pass filter for signals in a first frequency band, an input circulator, an amplifier, an output circulator and a first output band-pass filter for signals in said first frequency band,
   a second signal path including a second input band-pass filter for signals in a second frequency band, an input circulator, an ampifier, an output circulator and a second output band-pass filter for signals in said second frequency band,
   a third input band-pass filter for signals in a third frequency band selectably connectable to the input circulator in said first or second paths, and
   two additional output band-pass filters for signals in said third frequency band, each coupled to an output circulator in a respective one of said first and second signal paths.

7. The combination of claim 6, and
   two additional output band-pass filters for signals in said first and second frequency bands, respectively, and a first switch reconnecting the output circulator in said first signal path to an additional band-pass filter for signals in said first frequency band, and a second switch reconnecting the output circulator in said second signal path to an additional band-pass filter for signals in said second frequency band.

8. In a transponder useful in a satellite for transmitting signals in three different r-f frequency band channels via two antennas to two regions on earth, the combination of an input triplexer having outputs for three different frequency band channels, two output triplexers each having three inputs for said three different frequency band channels, and each having one output for coupling to a respective antenna feed, two signal paths from two outputs of said input triplexer to said two output triplexers, each of said paths including, in the order named, a first circulator, an amplifier, a second circulator having first and second outputs, and a switch having one input connected to the first output of the circulator and first and second outputs, the second output of the second circulator in one path connecting to the input to the third channel in one output triplexer, and the first and second outputs of the switch in said one path connecting to the input to the first channel of said two output triplexers, respectively, the second output of the second circulator in the other path connecting to the input to the third channel in the other output triplexer, and the first and second outputs of the switch in said other path connecting to the input to the second channel in said two output triplexers, respectively, and a third switch for connecting a third output of the input triplexer to the first circulator in a selected one of said two signal paths, whereby to couple therein signals of a third frequency band channel.

* * * * *

UNITED STATES PATENT AND TRADEMARK OFFICE
CERTIFICATE OF CORRECTION

PATENT NO. : 4,109,202
DATED : August 22, 1978
INVENTOR(S) : Chandra Mohan Kudsia, et al.

It is certified that error appears in the above-identified patent and that said Letters Patent are hereby corrected as shown below:

Title Page, change "[73] Assignee: RCA Corporation, New York, N.Y." to --[73] Assignee: RCA Limited, Quebec, Canada--.

Signed and Sealed this

Twenty-seventh Day of November 1979

[SEAL]

Attest:

RUTH C. MASON
*Attesting Officer*

LUTRELLE F. PARKER
*Acting Commissioner of Patents and Trademarks*